Patented July 10, 1928.

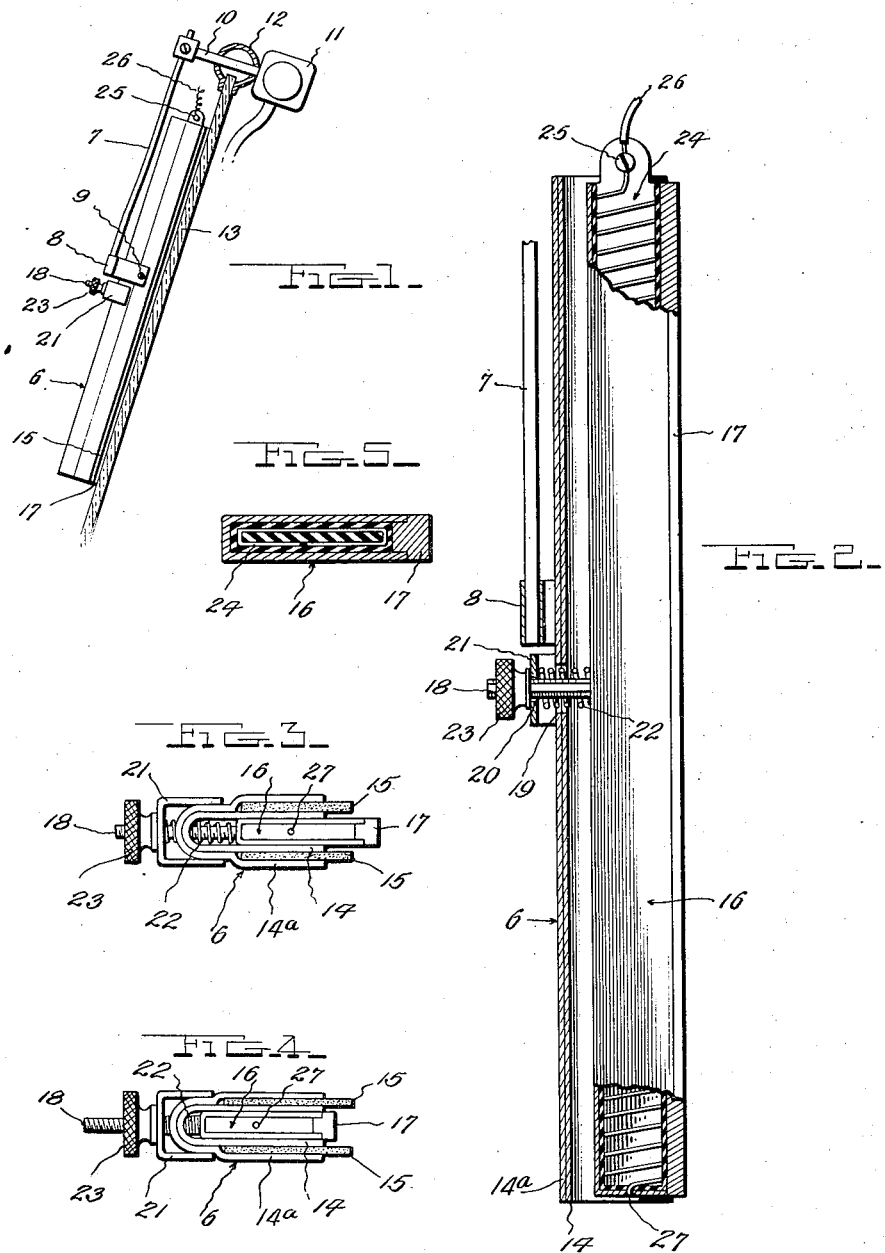

1,676,561

UNITED STATES PATENT OFFICE.

SELDEN P. KIENAST, OF BATTLE CREEK, AND CLARENCE E. DRAKE, OF PARMA, MICHIGAN.

WINDSHIELD WIPER.

Application filed July 11, 1927. Serial No. 204,961.

The invention relates to devices commonly known as windshield wipers although the present invention constitutes somewhat more than a wiper, as provision is made for electrically heating a part of the device to melt ice and snow from the windshield when desired.

It is the object of the invention to provide an exceptionally simple, inexpensive and compact wiper which embodies not only an ordinary flexible squilgee, but an electrically heated scraper, and means for projecting said scraper into contact with the windshield or for retracting it to permit contact of only the squilgee therewith.

With the foregoing in view, the invention resides in the novel subject matter hereinafter described and claimed, the description being supplemented by the accompanying drawings.

Fig. 1 is a side elevation showing the device applied.

Fig. 2 is an enlarged longitudinal section partly in elevation.

Figs. 3 and 4 are lower end views illustrating the heated scraper projected and retracted, respectively.

Fig. 5 is an enlarged horizontal sectional view through the heated scraper.

The drawings above briefly described, illustrate the preferred form of construction and while this construction will be hereinafter specifically explained, it is to be understood that the present disclosure is illustrative rather than limiting, in a number of respects.

The numeral 6 denotes a vertically elongated body which may be operated in any desired manner. For purposes of illustration, an arm 7 is shown having a clip 8 at its lower end pivoted to the body 6 as at 9, the upper end of said arm being connected to an operating shaft 10 which may have manual or automatic operating means, automatic mechanism being indicated in a general way at 11. The shaft 10 may be mounted in any of the usual ways, either above the frame 12 of a windshield 13, or passing through said frame, as will be readily understood.

The body 6 is composed of two channel-shaped sheet metal strips 14—14ª, the flanges of these strips being spaced apart and holding squilgees 15, while the flange-connecting portions of said strips are tightly secured together by soldering or in any other desired manner.

Slidably received between the side flanges of the channel-shaped body 6, is a windshield scraper 16 whose body portion may well be formed of sheet metal, while its scraping edge 17 is of heavier construction. A stud 18, preferably flat-sided to occupy less space, is secured to the edge of the scraper 16, remote from its scraping edge 17, said stud passing through the central portion of a relatively large opening 19 in the flange connecting portion of the body 6. This stud passes also through an opening 20 in a U-shaped yoke 21 which straddles and is secured to the body 6. A coiled compression spring 22 surrounds the stud 18 and passes through the opening 19, one end of said spring abutting the scraper 16 while the other end abuts the yoke 21. A thumb-nut 23 is threaded upon the outer end of stud 18 and by tightening this thumb-nut, the entire scraper 16 may be drawn into the channel-shaped body 6, so that only the squilgees 15 may contact with the windshield 13, as will be clear from Fig. 4. By loosening nut 23, spring 22 comes into play to project the scraper 16 and yieldably hold it in contact with the windshield.

Disposed within and suitably insulated from the scraper 16, is an electrical heating unit 24. One end of this unit, in the present showing, is provided with a binding post 25 for a current supply wire 26, whereas the other end of said unit may be grounded to the scraper 16 as denoted at 27 in Figs. 2, 3 and 4. Current from the battery of the machine passes through the wire 26 when an appropriate switch (not shown) is closed. This current flows through the heating unit 24 and thence through metallic parts of the windshield wiper and the automobile, to the ground of the machine and hence back to the battery.

Whenever only the use of the squilgees 15 is necessary, the entire scraper and heater 16 may be withdrawn into the body 6, as shown in Fig. 4 and the switch for the heating unit 24 will then of course be opened. Whenever an ice or snow storm is encountered however, the thumb-nut 23 may be loosened, causing spring 22 to project the scraper and heater 16 against the windshield, either beyond the squilgees 15 or flush therewith, as desired. When now the switch for the heater is closed, it promptly becomes efficiently heated to melt the ice on the windshield and scrape it therefrom. When the scraping edge 17 is flush with the squilgees 15, or perhaps spaced inwardly a trifle from their free edges, they also come into play to effectively wipe moisture from the windshield.

It will be seen from the foregoing that the invention is exceptionally simple and inexpensive, that it is quickly and easily convertible for removing only rain or loose snow, or ice from the windshield, and that the device will be in every way desirable.

Such excellent results have been obtained from the details disclosed, that they are preferably followed. However, within the scope of the invention as claimed, variations may be made as hereinbefore suggested. Moreover, it is to be understood that the word "squilgee" herein used, is not to be considered as limiting the invention to the use of a rubber or analogous strip, as in some instances, a mere pad of felt or analogous material may be employed.

What is claimed is:—

1. In a windshield wiper, a carrying body, a squilgee carried by said body, an electrically heated scraper carried by said body, and means whereby said scraper may be projected relative to said squilgee into contact with a windshield or withdrawn from such contact.

2. In a windshield wiper, a carrying body of channel form, a squilgee carried by a side of said body, an electrically heated scraper slidably mounted within said body, and means whereby said scraper may be projected relative to said squilgee from the body for contact with a windshield or may be retracted into the body from such contact.

3. In a windshield wiper, a channel-shaped body, a squilgee carried by said body, an electrically heated scraper slidably mounted in said body and having a stud projecting in the opposite direction from its scraping edge, and means associated with said stud for effecting projection and retraction of said scraper relative to said squilgee to bring it into or out of play as desired.

4. In a windshield wiper, a channel-shaped body, a squilgee carried by said body, an electrically heated scraper slidably mounted in said body and having a stud projecting in the opposite direction from its scraping edge, spring means acting upon said scraper in a direction to project it to operative position relative to said squilgee, and a nut threaded on said stud for retracting said scraper against the action of said spring means when desired.

5. In a windshield wiper, a channel-shaped body formed of two channel-shaped metal strips having their side flanges spaced apart and having their flange-connecting portions secured together, squilgees securely held in the spaces between said side flanges and projecting from the latter, an electrically heated scraper slidably mounted in said hollow body, and means whereby said scraper may be projected or retracted relative to said squilgee for contact with or disengagement from the windshield.

In testimony whereof we have hereunto affixed our signatures.

SELDEN P. KIENAST.
CLARENCE E. DRAKE.